United States Patent [19]

Lobjinski et al.

[11] Patent Number: 4,905,224

[45] Date of Patent: Feb. 27, 1990

[54] SORTING UNIT FOR A SWITCHING NODE COMPRISING A PLURALITY OF DIGITAL SWITCHING MATRIX NETWORKS FOR FAST, ASYNCHRONOUS PACKET SWITCHING NETWORKS

[75] Inventors: Manfred Lobjinski; Michael Horn; Andreas Reppekus, all of Munich, Fed. Rep. of Germany

[73] Assignee: Siemens Aktiengesellschaft, Berlin and Munich, Fed. Rep. of Germany

[21] Appl. No.: 247,680

[22] Filed: Sep. 22, 1988

[30] Foreign Application Priority Data

Sep. 30, 1987 [DE] Fed. Rep. of Germany ....... 3733068

[51] Int. Cl.$^4$ .......................... H04Q 11/04; H04J 3/26
[52] U.S. Cl. ....................................................... 370/60
[58] Field of Search ............................. 370/60, 94, 58; 340/825.52

[56] References Cited

U.S. PATENT DOCUMENTS

| | | | |
|---|---|---|---|
| 3,428,946 | 2/1969 | Batcher | 370/60 |
| 4,516,238 | 5/1985 | Huang et al. | 370/60 |
| 4,550,397 | 10/1985 | Turner et al. | 370/60 |
| 4,701,906 | 10/1987 | Ransom et al. | 370/60 |
| 4,734,907 | 3/1988 | Turner | 370/60 |

*Primary Examiner*—Douglas W. Olms
*Attorney, Agent, or Firm*—Hill, Van Santen, Steadman & Simpson

[57] ABSTRACT

A sorting unit for a switching node comprising a plurality of digital switching matrix networks for fast, asynchronous packet switching networks, which switching node comprises a multi-stage, mixed connection structure based, for example, on a banyan tree structure, that forms a complete truck group, such that every input of the switching node is connectable to every output thereof. The digital switching matrix networks are fashioned as self-controlling (self-routing) sorting units that are a multi-stage circuit switching arrangement comprising 2m-1 beta element columns of m beta elements ($\alpha$) each, whereby 2m is equal to the number of inputs and equal to the number of outputs of the sorting unit, and m is a power to two. The sorting unit is divided into a first sub-unit comprising m columns that functions as a distribution unit and a second sub-unit comprising m-1 columns that functions as a correction unit.

2 Claims, 5 Drawing Sheets

SORTING UNIT FOR A SWITCHING NODE COMPRISING A PLURALITY OF DIGITAL SWITCHING MATRIX NETWORKS FOR FAST, ASYNCHRONOUS PACKET SWITCHING NETWORKS

BACKGROUND OF THE INVENTION

The present invention is directed to a sorting unit for a switching node comprising a plurality of digital switching matrix networks for fast, asynchronous packet switching networks, whereby the switching node comprises a multistage, mixed connection structure, for instance in the fashion of what is referred to as a banyan tree structure, that forms a complete trunk group, namely such that every input of the switching node is connectable to every output thereof.

In future broad band ISDN (integrated switching digital networks), services such as "picture telephony", "video conferencing" and data communication with a high bit rate should be integrated therein in addition to the classic applications of "telephony" and "narrow band data transmission". Therefore, there is a necessity for different channels having different bit rates, for instance 64 kbit/s for telephony and 2-10 Mbit/s for "picture telephony" and "video conferencing".

In data communication, data streams having bit rates of 2-10 Mbit/s are also to be switched that, however, appear in batches (burst mode) and comprise such large gaps that the physical through-connection therefor in one line section is extremely ineffective. Therefore, the transmission and switching equipment would be only utilized at a low level of efficiency, but would have to remain reserved for availability when needed.

Packet switching systems (using a fast packet switch) are therefore planned for the switching of the data applications with a high bit rate, these packet switchings working faster and with simpler protocols when contrasted to the present "Datex-P-Network". These switchings that through-connect the high-bit-rate data streams without intermediate protection are also suitable for the switching of the other applications and thus open up the way to an actual integration of different communications applications in a common network.

As a consequence of the high processing capacity, the "fast packet" switching node should be constructed of components that work in a decentralized manner and that form the structure of a node in a multi-stage arrangement. Possible structures are derived from a simple, so-called banyan network and differ in such fashion that inner blockings are reduced or avoided. A distinction is generally made between packet-synchronous and packet-asynchronous switching nodes. Whereas synchronous, blocking-free switching nodes are known from the literature, the problem of inner blockings in asynchronous methods has not yet been satisfactorily resolved.

SUMMARY OF THE INVENTION

The present invention provides an asynchronous switching node having low blocking probability and a transmission rate of 40 Mbit/s per line.

An asynchronous system for packet switching is already disclosed by U.S. Pat. No. 4,491,945. This known system is composed of switching units having 64 inputs of 1.5 Mbit/s data rate each (equals 24 voice channels per input line). The structure of such a switching unit is shown in FIG. 1. It is composed of three columns of circuit switching elements each having four inputs and outputs that are wired such that every input can be connected to every output (to form a perfect shuffle). Every circuit switching element contains four input and output controllers (see FIG. 2) that are also connected by a "perfect shuffle" connection structure. Two address bits are required for the correct switching within a circuit switching element. Inner blockings are avoided by increasing the internal processing speed from 1.5 Mbit/s to 8 Mbit/s. A mode with time division multiplex is applied on the internal, more heavily loaded lines (see FIG. 1). An incoming data packet is first intermediately stored in the circuit switching element, but only until a free status signal comes from the next circuit switching element to which the packet is to be conducted. This intermediate storage cannot be eliminated due to the risk of blocking.

The call set-up in this known system occurs with central processors that also prompt the translation of the logical addresses into the physical addresses needed for the switching. The capacity of such a switching node amounts to 64*1.544 Mbit/s, or 100 Mbit/s.

The object of the present invention is to create a sorting unit for a switching node of the species initially cited with whose assistance it is possible to reduce the blocking probability within the switching node in comparison to that in known systems of the said species.

The object underlying the invention is achieved by a sorting unit of the species initially cited and having first and second sub-units interconnected to form a perfect shuffle.

An advantageous development of the invention is characterized by the provision of means for recognizing the beginning and end of a data packet, for establishing a privileged through-convert direction.

Figure 1:
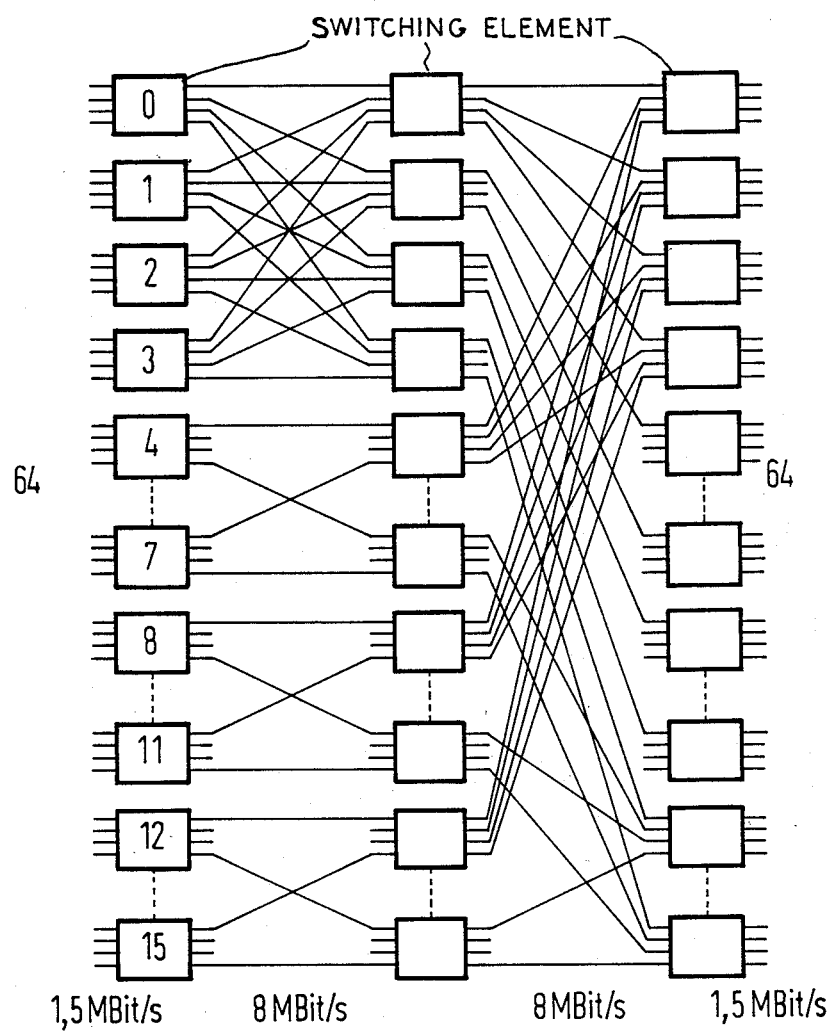
FIG. 1 shows the fundamental structure of a known switching node.
Figure 2:
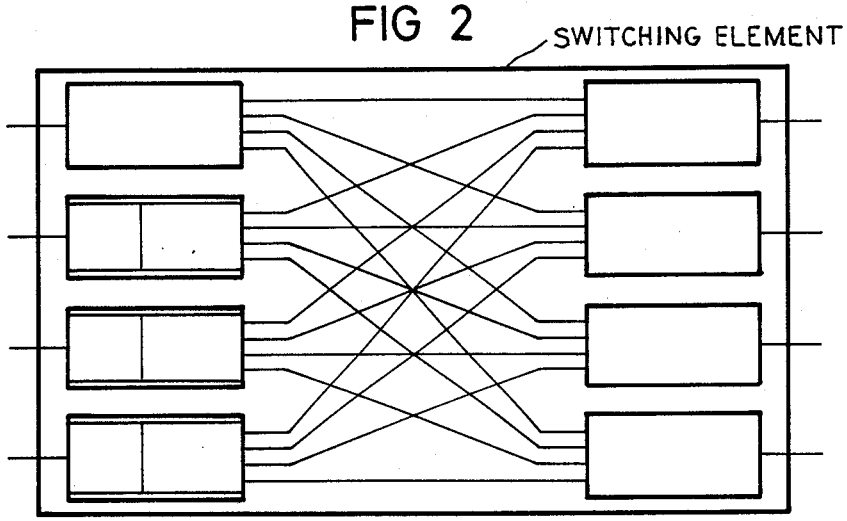
FIG. 2 shows the internal structure of a circuit switching element of the switching node of FIG. 1 in terms of a block circuit diagram.
Figure 3:
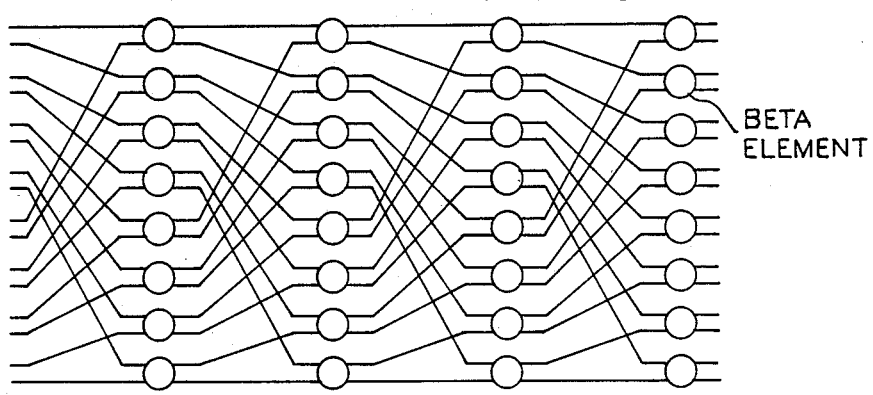
FIG. 3 shows the structure of a known banyan network.

The invention is based on a banyan network. A banyan network is a self-controlled (self-routing) switching node comprising $2^n$ input and output lines and the property that every output can be reached proceeding from every input. The banyan network is composed of n (perfect shuffle) columns and n beta element columns that are joined to one another in alternation, see FIG. 3.

What is meant by a "shuffle" is the connection of the outputs of a beta element column to the inputs of the next beta element column in the following, defined way. The first, second, third, . . . output is connected to the first, third, fifth, . . . input and the $2^{n-1}+1, 2^{n-1}+2, 2^{n-1}+3, \ldots$ output is connected to the second, fourth, sixth, . . . input of the next beta element column.

Figure 4:
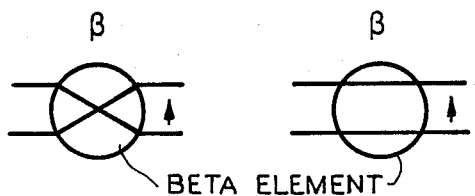
FIG. 4 schematically shows what is referred to as a beta element with its two possible switch positions, showing this in detail two views.

A beta element is a module comprising two input and output lines and a pre-setting that is identified by an arrow. The inputs and outputs in the beta element can be connected to one another in parallel, or crossed, see FIG. 4. A free beta element is controlled by the first bit of a packet. When the first bit is a "1", then the packet is forwarded in arrow direction; otherwise, it is forwarded opposite the arrow direction. When the packet encounters a beta element that is already fOrwarding another packet, then it is routed onto the free output, independently of the bit and the arrow direction.

The data are switched in the following way in the banyan network:

The data are preceded by a header having n address bits. The address bits exactly correspond to the number of the desired output lines in binary representation. Exactly one bit of the address is interpreted and destroyed in every beta element. The path of a data stream to the desired output is unambiguous in the banyan network. When two or more data streams are to be simultaneously switched, then sub-sections of the lines in the banyan network may possibly be simultaneously claimed by a plurality of data streams. Since, however, each line is designed for only one data stream, the other data streams are blocked.

Figure 5:
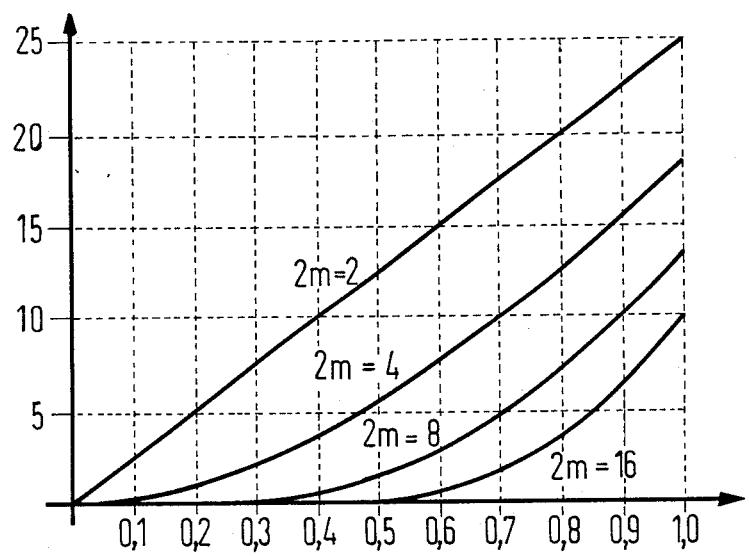
FIG. 5 shows a diagram comprising a curve family relating to the blocking probability of a sorting unit having 2m input lines.
Figure 6:
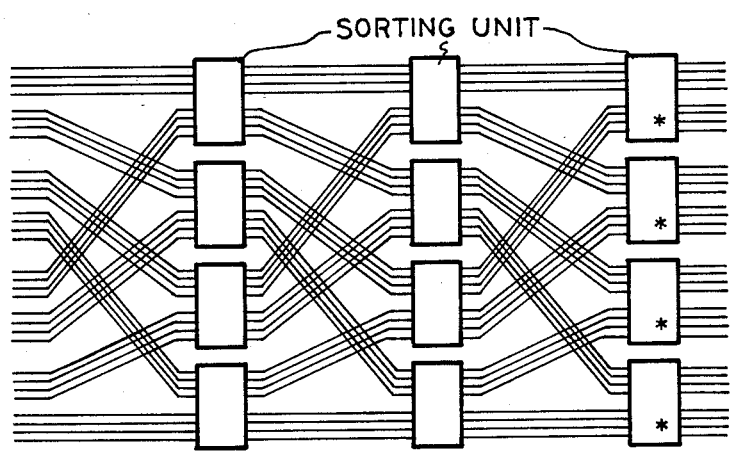
FIG. 6 schematically shows a switching node comprising sorting units instead of beta elements (n=5, m=4 m).

In order to keep the blocking probability as low as possible, sorting units (sorters) having 2m (in which m=a power of two) input and output lines can be used instead of beta elements. Like the beta elements, the sorting units each interpret one bit of the address and route the data stream onto one of the upper m or one of the lower m output lines dependent on the address bit. As a result of this measure, the blocking probability is reduced in the banyan network, as shown in FIG. 5. The connecting structures in the banyan network must therefore be sorted in a suitable modified way A network having such a modification still has n−1d (m) columns and is shown in FIG. 6.

Figure 7:
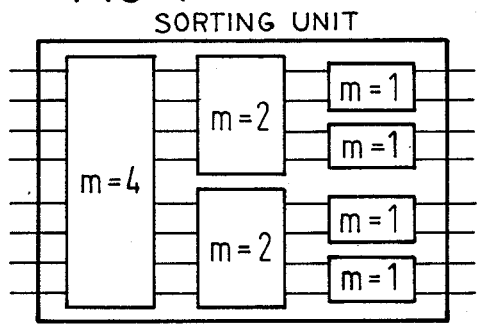
FIG. 7 shows a sorting unit of a last beta element column according to FIG. 6 comprising six input and output lines (m=4) in terms of a block circuit diagram.

The sorting units of the last column differ from the other sorting units since only one output line of the switching node (and, thus, of the sorting unit of the last beta element column) for each packet corresponds to the local address of the packet. They are constructed of 1d(m)+1 stages, whereby the first, second, . . . , 1d(m)+1th stage is exclusively composed of the ("above-described") sorting units having 2m, m, . . . , 2 input and output lines. When one bit of the address is interpreted in each stage, then the packet is routed onto the desired output (see FIG. 7).

The sorting unit is the actual subject matter of the present invention. It shall therefore be set forth in detail below.

The sorting unit is a switching node that is composed of de-centrally operating beta elements and of "perfect shuffles".

The job of the switching node comprising 2m input lines is comprised in steering asynchronously in-coming packets onto one of the upper and lower m lines, dependent on a bit value. Already existing connections must not be modified.

The present invention is thereby based on the following consideration: uniform distribution of all packets having a bit "1" and all packets having "0", so that each of the beta elements in the last column of the switching node receive at most one packet having bit "1" and at most one packet having bit "0". Packets having "1" are then routed up by a "perfect shuffle" and packets having bit "0" are routed down.

Figure 8:
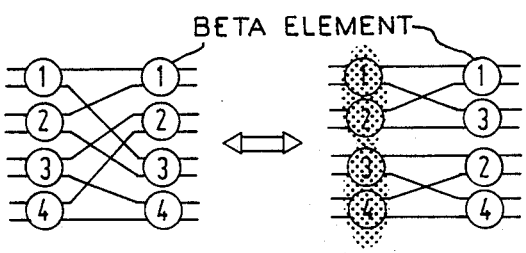
FIG. 8 shows an illustration of what are referred to as "interrelated" beta elements.

A special property of the "perfect shuffle" plays a significant part in the structure of the sorting unit. In the "perfect shuffle", all lines can be combined in groups of four lines each that then each connect two beta elements to one another, as shown in FIG. 8. A suitable resorting of the beta elements is intended to illustrate this with reference to a "perfect shuffle" having eight lines, see FIG. 8. Of the four beta elements that belong to a group of lines (see FIG. 9), the two left-hand beta elements shall be referred to below as being "interrelated". Given "interrelated" beta elements, the beta elements that forward two packets having bit "1" are referred to as full; those that forward a single packet having bit "1" are referred to as neutral; and those that forward no packet are referred to as empty.

Figure 9:
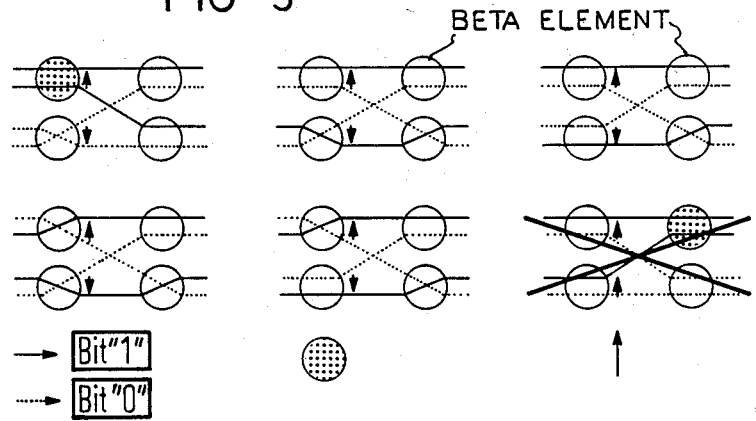
FIG. 9 shows an illustration of what are referred to "interrelated" beta elements having arrows entered for privileged through-connection directions.

When at least one of two "interrelated" beta elements having opposite arrow direction is empty, then both of the beta elements connected to these beta elements will not be full, see FIG. 9. This is not the case given isodirectional arrow directions. What is thus assured by opposite arrow directions given "interrelated" beta elements is that the plurality of full beta elements per column does not increase. In analogous fashion, the definitions of full and empty beta elements can also be transferred onto the beta elements that forward the packets having bit "0". The same conclusions as hitherto drawn likewise apply in this case. FIG. 9 shows each combination of two packets supplied to a single pair of interrelated beta elements (omitting redundnat mirror images) with unlike arrow directions. It also shows no case which is not allowed, with like arrow directions.

Figure 10:
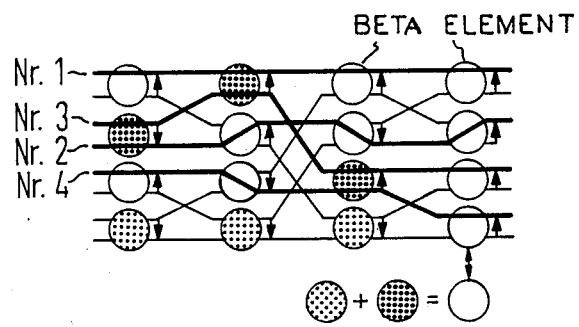
FIG. 10 shows an illustration from which the "movements" of "empty" and "full" beta elements proceed.

FIG. 10 shows that a full and an empty beta element "migrate" from column to column until they are interrelated beta elements in one column. In this case, both beta elements convert into the neutral condition in the next beta element column. It may also be seen that the full beta elements "migrate" opposite the arrow direction and that the empty beta elements "migrate" in arrow direction.

A uniform distribution of the packets in the last column of the switching node is accordingly obtained when two arbitrary beta elements of the first column meet the following condition: when the one beta element is "tracked" in the arrow direction and the other is tracked opposite to the arrow direction, then the beta elements must be interrelated beta elements in some column or other. Under this condition, namely, the full and the empty beta elements convert into two neutral beta elements in the next column. If the node routes fewer packets having bit "1" than there are output lines provided therefor, then there are more empty than full beta elements in the first column, and a full beta element can no longer occur in the last column.

Figure 11:
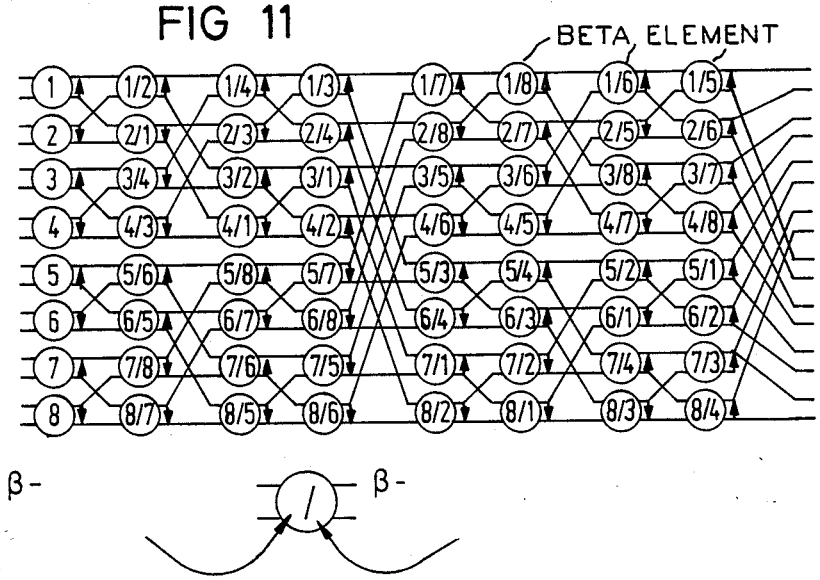
FIG. 11 shows the structure of a switching node for 16 lines.

FIG. 11 shows an example of a switching node (having 2m=16 inputs) that meets the required condition. Every beta element encounters a new beta element in every column, i e. at least m−1 columns are required for such a switching node. Only one beta element column is then still required for separating the packets having bit "1" and bit "0". It may also be seen in FIG. 11 that the sorting unit having 2m input lines is essentially constructed of four sorters having m input lines. A recursive structure is accordingly present here that allows sorting units to be constructed in any arbitrary power of two.

The switching node of FIG. 11, however, guarantees only one separation of the packets having bit "1" and bit "0" given one-time occupation of the individual lines.

Figure 12:
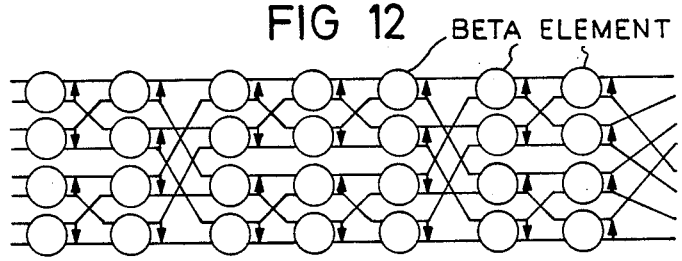
FIG. 12 shows the structure of a switching node comprising 2m=8 input lines and 2m−1=7 beta element columns.

In order to achieve a good functioning of the sorting unit during connection set-up and clear-down, in accordance with the arrow direction, the first m−1 beta element columns together with the appertaining connection structures are "copied" by the sorting unit, see FIG. 12. The new sorting unit comprising 2m−1 columns meets the required function up to approximately 100%, given a realistic load of up to 60% packet with "1" bite.

The particular advantage of the circuit of the invention is comprised in the uniform structure that is exclusively composed of decentrally operating beta elements $\beta$. The maximum clock rate of the circuit is essentially determined by the flip-flops contained in the beta elements $\beta$. In CMOS-VLSI technology, this currently amounts to about 40 Mbit/s. Since the switching node can be generally expanded to every power of two of input lines, transmission capacities in the gigabit range are obtained beginning with 32 input lines of the switching node. Memories in the switching node can be eliminated in accord with the invention. Given a statistically distributed load, this effects a loss of only about $10^{-4}$ packets due to blocking. The switching node is thus particularly suited for switching packets having a high proportion of picture telephony or voice transmission.

The beta elements $\beta$ can be preferably realized in CMOS technology.

It will be apparent that various modifications and/or additions may be made in the apparatus of the invention without departing from the essential feature of novelty involved, which are intended to be defined and secured by the appended claims.

What is claimed is:

1. A sorting unit for a switching node comprising a plurality of digital switching matrix networks for fast, asynchronous packet switching networks, said switching node comprising a multi-stage, mixed connecting structure in accord with a banyan tree structure, that forms a complete trunk group in which every input of the switching node is connectable to every output thereof, characterized in that said digital switching matrix networks comprise a plurality of self-controlling and self-routing sorting units that are a multi-stage circuit switching arrangement comprising a rectangular array of beta elements ($\beta$) with m rows and 2m−1 columns, where 2m is equal to the number of inputs and is also equal to the number of outputs of the sorting unit and m is a power of two;

each said sorting unit is divided into a first sub-unit acting as distributor unit comprising an array of beta elements ($\beta$) with m columns, and a second sub-unit acting as a correction unit comprising an array with m-1 columns of beta elements ($\beta$);

said sub-units each composed of m smallest units, each said smallest unit respectively containing four beta elements, of which two beta elements form one input pair and two beta elements form one output pair, said pairs being connected to one another such that every input of said input pair of connectable to every output of said output pair;

two first ones of said smallest units forming an input unit pair and two second ones of said smallest units forming an output unit pair, whereby said units are in turn connected such to one another that each of the inputs of an input unit pair is connectable to each of the outputs of an output unit pair; and means for connecting the outputs of the last ($2m-1^{th}$) column of said correction unit to a following group of switching matrix networks of the switching node.

2. The sorting according to claim 1, characterized in that each said beta element ($\beta$) comprises memory function for holding the switch status set with the first bit of a data packet to arrive and comprises a packet recognition function for recognizing the start of a data packet and the end of a data packet; and in that said beta element ($\beta$) comprises a privileged through-connect direction for the respectively more significant bit at one of its two inputs.

* * * * *